Oct. 4, 1966   R. S. WEBB   3,277,337
LONG ON-TIME PULSE CUT-OFF CIRCUITRY FOR ELECTRICAL
DISCHARGE MACHINING APPARATUS
Filed May 17, 1961   3 Sheets-Sheet 3

INVENTOR.
Robert S Webb
BY
M K Murphy
ATTORNEY.

United States Patent Office 3,277,337
Patented Oct. 4, 1966

3,277,337
LONG ON-TIME PULSE CUT-OFF CIRCUITRY FOR ELECTRICAL DISCHARGE MACHINING APPARATUS
Robert S. Webb, Bloomfield Hills, Mich., assignor to Elox Corporation, Troy, Mich., a corporation of Michigan
Filed May 17, 1961, Ser. No. 110,780
14 Claims. (Cl. 315—127)

This invention relates to electrical discharge machining particularly to improved machining power circuits therefor.

Electrical discharge machining, sometimes referred to in the art as EDM, spark machining, or arc machining, is carried on by passing a series of discrete, localized extremely high current density discharges across a gap between a conductive tool electrode and workpiece at sonic or ultrasonic frequencies in the presence of a dielectric fluid for eroding the workpiece.

In electrical discharge machining, the conductive tool is usually maintained in proximate position with the workpiece by an automatic servo feed and is advanced toward or into the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

In my copending application Ser. No. 26,526, filed May 3, 1960, issued as U.S. Patent No. 3,018,411, on Jan. 23, 1962, I described a novel short circuit protection device designed to electronically inspect each individual machining pulse in regard to acceptable characteristics, and any pulse of abnormal characteristic is interrupted in a small portion of the normal pulse duration thereby greatly reducing current during this failure condition and protecting the electronic switch as well as the electrode and workpiece. A further investigation of operation of the circuitry of that patent reveals that an operating difficulty sometimes occurs particularly with a power circuit having widely varying ON-OFF ratios or a duty factor approaching 75% or more.

In the circuitry of the above patent the per pulse circuit is actuated to trigger the normal OFF-time of the pulser, thereby limiting individual discharge damage as outlined therein and protecting the electrode and workpiece. If, however, the normal ON-time is long with respect to OFF-time, repeated short circuit pulses occur at a much higher than standard frequency. For example a machine having a 75% duty factor would increase in basic frequency by four times over the normal operating frequency on short circuit.

This increased rate of switching can actually damage equipment not designed for the increased switching. Particularly with transistor power circuits as outlined herein, the limiting power dissipation within the device is frequently caused during switching. This results from the heat generated during rise, storage and fall time of the device operated as a switch. Maximum operating efficiency may be had if the short circuit switching rate is the same as or even somewhat lower than the normal operating switching rate.

Furthermore, I have found that after a faulty pulse it is desirable within the working gap to provide a longer OFF-time. This longer than normal OFF-time permits more rapid recovery of satisfactory machining conditions. Pulses repeated after the normal OFF-time after a failure pulse frequently also break down into failure whereas even a slight increase in OFF-time frequently permits recovery of the proper gap conditions whereby the following pulse machines normally.

Accordingly it is the principal object of this invention to provide an improved per pulse cut-off circuit, having means for delaying the discharge immediately following a faulty pulse.

Another object of this invention is to provide an improved machining power circuit employing solid state devices having long life and reliability characteristic of those devices including delayed discharge per pulse cut-off protection.

Still another object of this invention is to provide a one shot multivibrator type of per pulse cut-off circuitry for more positive protection.

Other objects and advantages are disclosed in the following specification, which taken in conjunction with the accompanying drawings, show preferred forms of practicing the invention.

In the drawings in which reference numerals have been used to designate like parts herein referred to:

Figure 1:
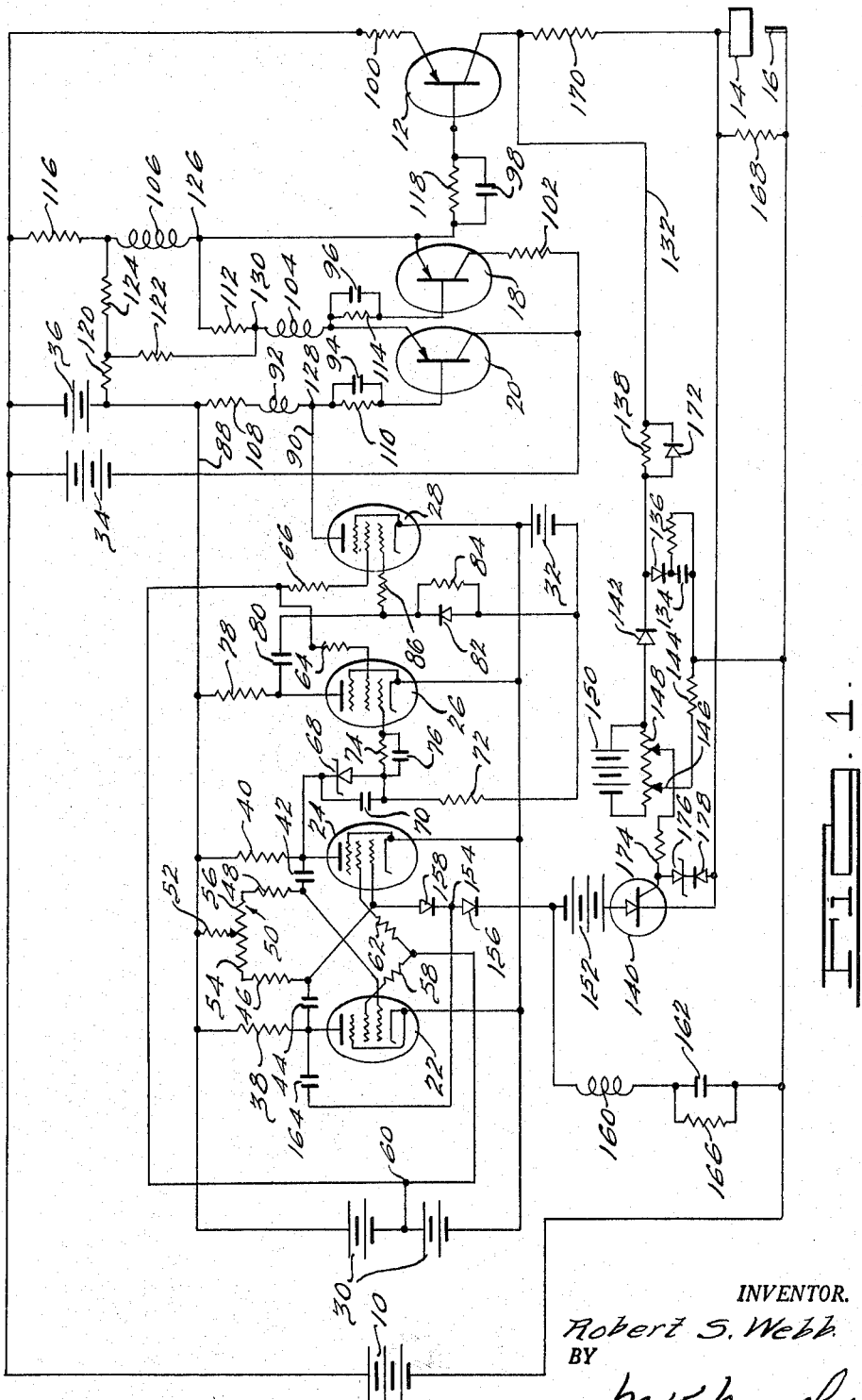
FIG. 1 shows a typical machining power circuit employing the present invention and including a vacuum tube type multivibrator and pulser preamplifier coupled to a transistor amplifier for driving the output bank of transistors with extremely sharp pulse drive.

Referring now to FIG. 1, machining power supply 10 is electronically switched by power transistor 12 for controlling the pulse duration and frequency of discharge across the gap between the workpiece 14 and electrode 16. Power transistor 12 represents a bank of transistors, sometimes hundreds in number, depending on the machining power circuit required.

PNP transistors 18 and 20 are preamplifiers for driving the base of transistor 12 with the extremely high drive current required for a large bank of transistors. The rectangular pulse signal derived from multivibrator tubes 22 and 24 is preamplified in pentodes 26 and 28 which again may be banks of vacuum tubes to present suitable rectangular drive to the preamplifier transistors.

Power for the vacuum tube pulser and preamplifier is derived from plate supply 30 and bias 32. Drive power for the transistor preamplifier is obtained from transistor drive power supply 34. Transistor bias supply 36 is provided for biasing the transistors during periods of non-conduction just as bias 32 is provided for the vacuum tube preamplifier.

Multivibrator pentodes 22 and 24 have output signal resistors 38 and 40 connecting the anodes of the multivibrator tubes to the positive terminal of the plate supply voltage 30. The control grids of tubes 22 and 24 are cross-connected respectively through coupling capacitors 42 and 44 to the anodes of the opposing tube and grid current limiting resistors 46 and 48 are connected as shown to rheostat 50 which, in combination with these two resistors and coupling capacitors 42 and 44, forms the time constant of operation of the multivibrator. The adjustable tap of rheostat 50 is connected through balancing resistor 52 to the positive terminal of supply 30.

This novel grid return of the multivibrator is extremely important in a modern electrical discharge machining power circuit because of the wide range of ON-OFF ratio required at a particular frequency. It is desirable to have the machine maintain the constant frequency and have a widely adjustable ON-OFF ratio at that particular frequency. This is achieved through the novel grid return rheostat 50.

As the adjustable tap or rheostat 50 is moved from side to side a decrease in resistance 54 on one side of the tap, increases resistance 56 on the other side thereby maintaining constant total grid resistance even though each grid circuit varies widely.

It is well known in multivibrator design that the operating period of a multivibrator may be represented by the formula:

$$t = K[C42(R48+R56) + C44(R46+R54)]$$

If coupling capacitors 42 and 44 are equal, the formula may be simplified to:

$$t = K_1(R48+R50+R46)$$

From this simplified formula, it can be seen that as the tap on rheostat 50 is moved from one extreme to the other, resistance is similarly moved from one grid return to the opposing grid return, thereby maintaining a constant frequency regardless of the position of rheostat 50.

The screen grid of pentode 22 is connected through resistor 58 to tap 60 on plate supply 30. Similarly, resistor 62 connects the screen of tube 24 to that same supply, just as resistors 64 and 66 return the screens of tubes 26 and 28 respectively to the screen grid tap of the plate supply.

Another important characteristic of this circuit is shown in the means of coupling the output signal of the multivibrator to the control grid of amplifier 26. As mentioned above, wide ratios of adjustment of ON-OFF ratio are required in a present day machine, particularly with regard to the minimum ON-time or output pulse duration of transistor bank 12. Analysis of this circuit will show that multivibrator tube 24 and power transistor 12 are ON or rendered conductive in phase. For extremely short or narrow ON-times, insufficient power is transferred through a coupling capacitor and therefore an improved circuit is required to properly couple the output of the multivibrator to amplifier tube 26.

This improved coupling circuit is achieved through use of a reference diode 68 and shunt capacitor 70 for referencing the rectangular or pulse output developed across signal resistor 40 downward as is required for proper control of the grid of amplifier 26. Bias return resistor 72 is provided to maintain tube 26 biased OFF during nonconducting portions of its cycle.

As multivibrator tube 24 becomes conductive, a voltage drop occurs across signal resistor 40. A typical value for plate supply voltage 30 is approximately 250 volts and the drop across multivibrator tube 24 during conduction is approximately 100 volts, therefore generating a signal of approximately 150 volts across resistor 40.

As long as the regulated voltage of reference diode 68 is larger than the drop across tube 24, the control grid of tube 24 will at this time, be negative. In the example given, this reference diode would have a magnitude of regulation of approximately 200 volts and the control grid of tube 26 would therefore be biased to approximately minus 100 volts. Reference diode 68 and capacitor 70 form a network for a floating voltage supply having almost no capacitive losses during switching as would be encountered if a D.C. supply were developed and employed at this point with the high frequency passing characteristics required for sharp rise and fall of drive signal.

As multivibrator tube 24 becomes nonconductive, the voltage signal across resistor 40 disappears, thereby carrying the reference diode circuit positive. In this example, with a 250 volt plate supply and a 200 volt reference diode, approximately 50 volts is developed across resistor 74 connected in the control grid of tube 26 since the control grid clips the signal at approximately the same voltage as the cathode of tube 26. An extremely small lead capacitor 76 is connected across resistor 74 for improving the sharp rise and fall characteristics of this signal thereby causing amplifier 26 to both amplify and re-square the signal.

Amplifier 26 develops a signal across resistor 78 which is coupled through capacitor 80 and clamping diode 82 to the grid circuit of amplifier 28. Bias return resistor 84 and grid current limiting resistor 86 are provided as shown in a manner widely applied in pulser amplifier circuitry.

Generally the OFF-time or duration between pulses of the output transistor bank is at least 20% of the total signal compared to a minimum ON-time of less than 1% of total signal. For such a condition time of at least 20% for tube 26, sufficient power is transferred through coupling capacitor 80 and a normal coupling circuit may be employed in the grid circuit of amplifier 28.

In coupling the output of the last stage of vacuum tube amplification to the transistor preamplifier, the same problem prevails as in coupling the output of the multivibrator to the first stage of amplification. During narrow portions of conduction of the output transistor bank amplifier, tube 28 is also rendered conductive for a narrow portion of each cycle. An additional complication is that transistors are inherently low voltage high current devices and when connected in common emitter relationship as shown require large amounts of drive current compared to a vacuum tube device which is essentially a voltage switch except in the regions of grid current. For this reason, the vacuum tube amplifier is interconnected as shown with the transistor preamplifier in which the positive terminal of plate supply 30 is connected to the positive terminal of bias supply 36 of the transistorized amplifier and is interconnected by lead 88.

Lead 90 is connected to the anode of amplifier 28 and in conjunction with lead 88 represents the signal output of the vacuum tube preamplifier.

At the instant of turn-ON of amplifier tube 28, which usually represents a bank of vacuum tubes, electron flow is from the negative terminal of supply 30 to the cathode of amplifier 28. From the anode of amplifier 28 this electron flow occurs instantaneously through line 90 and is retarded by the inductance of choke 92. Lead capacitor 94 permits this electron flow to enter the base of first transistor amplifier 20. At this first instant, all transistors are nonconductive and this signal is additionally led from the emitter of transistor 20 through lead capacitor 96, the base-emitter of transistor 18, lead capacitor 98, base-emitter of transistor 12, balancing resistor 100 to the negative treminal of bias 36 and returned from the positive terminal of bias 36 to the positive terminal of the plate supply voltage of 30.

This principle represents the fundamental improvement of this form of circuitry in that from the first instant of drive, signal is led through each stage of the amplifier tending to render all of the transistors of the amplifier in addition to the output transistor bank conductive at the same instant. After the minute delay time required of transistor 20, it becomes conductive and amplifies signal and causes additional electron flow from the negative terminal of drive supply 34 through the collector-emitter of transistor 20 and additionally through the lead network 96, 98, 12, 100 just like the signal from amplifier tube 28. Similarly, as transistor 18 is rendered conductive, additional amplified signal flows from the negative terminal of supply 34 through limiting resistor 102, the collector-emitter junction of transistor 18 and additionally through the lead network 98, 12. During this period of turn-ON, almost no shunt current flows in the corresponding bias circuits being blocked from each bias circuit by choke 92, 104, 106 respectively. Furthermore, additional acceleration is provided by lead capacitors 94, 96, 98, thereby forcing all transistors sharply into conduction.

As lead capacitors 94, 96, 98 becomes charged and as conduction occurs through chokes 92, 104, 106, the circuit achieves steady state conduction. Resistors 108 and 110 are chosen with the voltage considerations in mind such that an approximately equal drive and shunt current flow occurs, the shunt current through choke 92 and resistor 108 after the minute delay interval of choke 92. Similarly, resistors 112 and 114 are chosen in accordance with this principle to provide equal drive current and shunt bias current during steady-state conditions as are resistors 116 and 118 respectively in the base circuit of transistor 12.

With the proper choice of these balancing resistors and consideration of the voltage dividers involved from bias supply 36, equal drive current and shunt current occurs in the base circuit of each transistor. As tube 28 is rendered sharply nonconductive, choke 92 continues electron flow from choke 92, resistor 108, resistor 120, resistor 122, choke 104, emitter-base of transistor 20, lead capacitor 94. Choke 92 sustains at the instant of turn-OFF a current equal to that flowing through it previously which by design is equal to the forward or drive current. The induced voltage of this choke in addition to the voltage stored across lead capacitor 94 presents a sharp turn-OFF signal through transistor 20, thereby rendering it sharply nonconductive.

In a similar manner, choke 104 forces electron flow through resistor 112, emitter-base of transistor 18 and lead capacitor 96 thereby sharply biasing transistor 18 nonconductive.

Choke 106 similarly forces electron flow through resistor 116, balancing resistor 100, emitter-base of transistor 12, lead capacitor 98, thereby rendering the output transistor bank sharply nonconductive.

An analysis of this circuitry will show that these cascaded chokes "kick" properly in phase to sharply turn-OFF their respective transistors and output signal is divided from these chokes by the divider resistor networks as shown. Thus, a shunt path or electron flow for choke 106, for example, is also through resistors 124, 122, 112, which would tend to cause transistor 18 to remain conductive. Because the base circuit of transistor 18 is returned at point 126, the reflected magnitude of this "kick" is sharply reduced being equal only to the voltage developed across resistor 112. This voltage resulting from the "kick" of choke 106 is overcome by the "kick" of choke 104 in the base circuit of transistor 18. A similar divider occurs in returning the base circuit of transistor 20 to the anode of tube 28 at point 128. Thus, a portion of the choke voltage induced in each case is fed back to the preceding stage and is overcome by the choke of that preceding stage. Choke 92 and resistor 108 which are of high impedance, characteristic of the vacuum tube circuitry, must conduct to overcome the "kicks" of all subsequent chokes. Therefore, the induced voltage of choke 92 must exceed the total of chokes 106, 104, in order to sharply bias transistor 20 nonconductive by addition to the bias stored across capacitor 94 during conduction drive.

This unique circuit employing shunt choke drive and the cascaded returns as shown at 126, 130, 128 forms an extremely sharp pulse drive during turn-ON of the transistor causing lead of drive current through the transistor network and during turn-OFF sustaining a sharp high conduction current for the duration of storage time and turn-OFF time of each stage of the transistor amplifier. By proper choice and balancing of these chokes, extremely sharp turn-OFF characteristics can be achieved for each stage of the transistor amplifier and of the entire amplifier as a unit. The degree of interconnection and cascading of this circuit is complex and requires special consideration in the calculation of each choke value and resistance value accordingly.

During periods of static nonconduction in which turn-OFF has been achieved and no current is flowing in the respective base circuits, bias is achieved on each stage of the transistor amplifier through the novel divider shown as resistors 116, 124, 120. Resistors 116, 124 and 120 are of successively higher resistance values, thereby producing a low voltage D.C. bias on the base of output transistor bank 12 and somewhat higher bias voltages on the bases of transistors 18 and 20 respectively. An additional resistor 122 is shown connecting point 130 with the tap between resistors 124 and 120 to provide bias to transistor 18. By proper selection of resistors 124 and 120, in accordance with the division of signal as previously outlined, this resistor may be eliminated. However, additional voltage is developed across resistor 112 from the induced voltage of choke 106 during turn-OFF unless resistor 122 is properly selected.

Normally, the machining power voltage 10 is very near the peak voltage rating of transistor bank 12, which is rated for voltage from collector to base as well as collector to emitter. By supplying an extremely low bias voltage of low impedance for the base of transistor 12, full advantage may be taken of the voltage ratings of this output transistor switch. Because of the extremely high drive currents required, excess power loss would occur in resistors 102 and 118 except that drive supply 34 is of much lower voltage magnitude than machining power voltage 10. For this reason, higher bias voltages may be employed on transistors 18 and 20 without limitations in output switching.

During a condition of choke induced voltage, the total voltage from emitter to collector of transistor 18 is that of supplies 34, 36, resistor 116, choke 106 which at that instant is positive at terminal 126, therefore producing a somewhat higher switching voltage during the induced voltage of each of these chokes than the D.C. voltage of supplies 34, 36. Similarly, the voltage across choke 104 is added to that of 106 in the emitter-collector circuit of transistor 20 thereby producing an even higher switching voltage for this transistor. As mentioned earlier, the total voltage of choke 92 must exceed the sum of the others, however this is well within the rating of the peak anode voltage of vacuum tube 28 since it is a high voltage device having a rating of several thousand volts rather than the maximum of 100 to 200 volts typical for power transistors of this type.

During pulse operation in which the output transistor bank is rendered sharply conductive and sharply nonconductive, this improved circuitry therefore provides extremely accelerated drive having sharp turn-ON and turn-OFF characteristics vastly improving the normal switching times of the particular transistors without additional loss of switching power.

This circuit includes an improved per pulse short circuit sensing network for sensing abnormally low voltage conditions across the machining gap. As the output transistor bank 12 is rendered sharply conductive, keying lead 132 connected to this cut-off circuitry at this time "keys" it into operation. During periods of conduction, line 132 is connected to the positive terminal of supply 10, less the minute losses in the collector-emitter circuit of transistor 12 and balancing resistor 100. This positive signal at line 132 draws electron flow through delay capacitor 134, diode 136, delay resistance 138. After the delay interval determined by product of capacitor 134, resistor 138, a portion of this positive or keying signal is presented to the gate circuit of silicon controlled rectifier 140. At this instant, the cathode of diode 142 is carried positive and therefore blocks electron flow. Connected to the negative end of delay capacitor 134 is resistor 144 and a sensing lead returning this network to the negative terminal of supply 10 and also to electrode 16. Since rectifier 142 is blocked at this instant, a keying voltage determined by the difference between taps 146 and 148 from keying supply 150 carries the gate positive with respect to the electrode by the difference in this voltage between 146 and 148.

If, after the delay time of network 134, 138, the electrode and workpiece are open circuited or if the machining voltage is above this preset amount, the cathode of controlled rectifier 140 will be more positive than the gate, thereby maintaining the controlled rectifier nonconductive. If a short circuit occurs or if the gap voltage between electrode 16 and workpiece 14 is below this predetermined amount, the gate is keyed positive with respect to the cathode and instantaneously triggers conduction of controlled rectifier 140. This condition corresponds to short circuit or an undesirably low machining voltage across the gap and should be so interrupted.

Conduction of controlled rectifier 140 through cut-off voltage supply 152 carries point 154 sharply negative since the cathode, at this instant, is approximately at the same voltage as electrode 16. Supply 152 is larger in voltage than the net of voltages 10, 36, 30, thereby carrying point 154 more negative in voltage than the cathode of multivibrator tube 24. As explained earlier, multivibrator tube 24 was conductive during this period of gap conduction caused by switching ON of transistor 12. Carrying point 154 negative with respect to the cathode, causes conduction through diodes 156 and 158, triggering multivibrator tube 24 nonconductive. As this tube is rendered even partially nonconductive, the signal becomes regenerative and is amplified by the normal multivibrator action of tubes 22 and 24 thus rendering tube 24 sharply nonconductive and interrupting conduction of machining power bank 12 which of course interrupts the flow of power through the machining gap.

Since a negative voltage is required at the anode of controlled rectifier 140 to interrupt the conduction of that device, it is achieved through choke 160 and capacitor 162. During this period of rectifier conduction, capacitor 160 is charged to the voltage of supply 152 through choke 160. Electron flow, in this instance, is through controlled rectifier 140, supply 152, choke 160, capacitor 162, electrode 16, workpiece 14 to the cathode of controlled rectifier 140. This causes a voltage drop across choke 160 inducing a flux field in this choke. As capacitor 162 become charged equal to supply 152, the field of choke 160 collapses to sustain conduction thereby overcharging capacitor 162. This capacitor is overcharged to a voltage approximately twice that of supply 152. After collapse of the field of choke 160, this negative voltage stored across across capacitor 162 flows back through choke 160 thereby presenting a negative voltage at the anode of controlled rectifier 140 causing it to cease conduction. Additional electron flow occurs from this capacitor into diodes 156, 158 and multivibrator coupling capacitor 44. A shunt electron flow occurs through diode 156 into capacitor 164 which adds to coupling capacitor 44. This larger capacity maintains the grid of tube 24 negative for a longer duration than normal and therefore permits complete recovery of the machining gap. Generally, this capacitor is two to three times the capacity of 44 thereby increasing the OFF-time by this amount. After discharge of capacitors 164 and 44, the multivibrator triggers into conduction in the normal manner and diodes 158 and 156 again block. The time constant of resistor 166, capacitor 162 is of sufficient length to cause recovery of the blocking characteristic of controlled rectifier 140.

In a typical electrical discharge machine, a wide variety of frequencies are used and this is achieved through different values of coupling capacitors such as 42, 44 or through changes in resistors 48, 50, 46. This is achieved through switching means and is straightforward and is not shown in the interest of simplicity. In each case, however, where coupling capacitor 44 is switched, OFF-time control capacitor 164 must also be switched to maintain this same approximate time relationship between a failure pulse and a normal conduction pulse. Capacitor 162 and choke 160 conduct relatively higher current than either capacitor 164 or capacitor 44, such that changes in these values of capacitance do not materially affect this turn-OFF circuit.

During normal periods of OFF-time in which controlled rectifier 140 has not fired, bias is maintained on the gate of that rectifier by electron flow through tap 146, resistor 144, resistor 168, resistor 170, keying lead 132, diode 172, diode 142, to the positive terminal of bias supply 150. At this time, the cathode controlled rectifier 140 is returned to resistor 168 and through application of this divider network, the gate is maintained negative at these times. If this negative bias exceeds a rating of the particular device, resistor 174, reference diode 176, diode 178 are provided to additionally clip this signal to within the negative or bias rating of the particular controlled rectifier.

Operation of this complete circuit is therefore within the design considerations in which the output transistor bank is rendered sharply conductive or nonconductive at selected ON-OFF ratio and selected frequency during normal machining permitting pulsing of the gap at this ON-OFF ratio and controlled machining results.

For a constant value of resistance 170 and a constant supply voltage 10, machining current increases in direct proportion to the ON-time at a particular frequency. In this manner, very exact control is achieved of actual machining current. This resistor is sometimes additionally switched to cause a different peak machining current thereby permitting even more accurate adjustment of machining conditions.

The per pulse cut-off circuitry responds instantaneously and through application of this novel keying network permits each pulse of machining power to be electronically inspected. Since satisfactory machining at the gap takes place above approximately 15 volts, the level of this keying reference may be set accordingly and any pulse having a gap voltage lower than 15 volts or the desired voltage, is instantaneously interrupted by the per pulse cut-off circuit after the desired leading edge delay interval. During times of this malfunction at the gap, a new OFF-time prevails as determined by this improved cut-off circuitry thereby permitting complete recovery of the gap between pulses and yet not interrupting or cutting off pulses during desirable machining conditions. It is not uncommon in a train of many pulses to have perhaps two or three pulses pass satisfactorily; one pulse representing unsatisfactory conditions being interrupted permitting thereafter a series of additional satisfactory pulses, etc., a method of circuit operation superior to those previously used in the art. By proper selection of delay capacitor 134, the leading edge of each pulse is permitted to pass thereby achieving the effect of breaking minute stringers that tend to bridge the gap between the electrode and workpiece in a manner substantially better than that disclosed in the above mentioned Patent No. 2,951,969.

Figure 2:
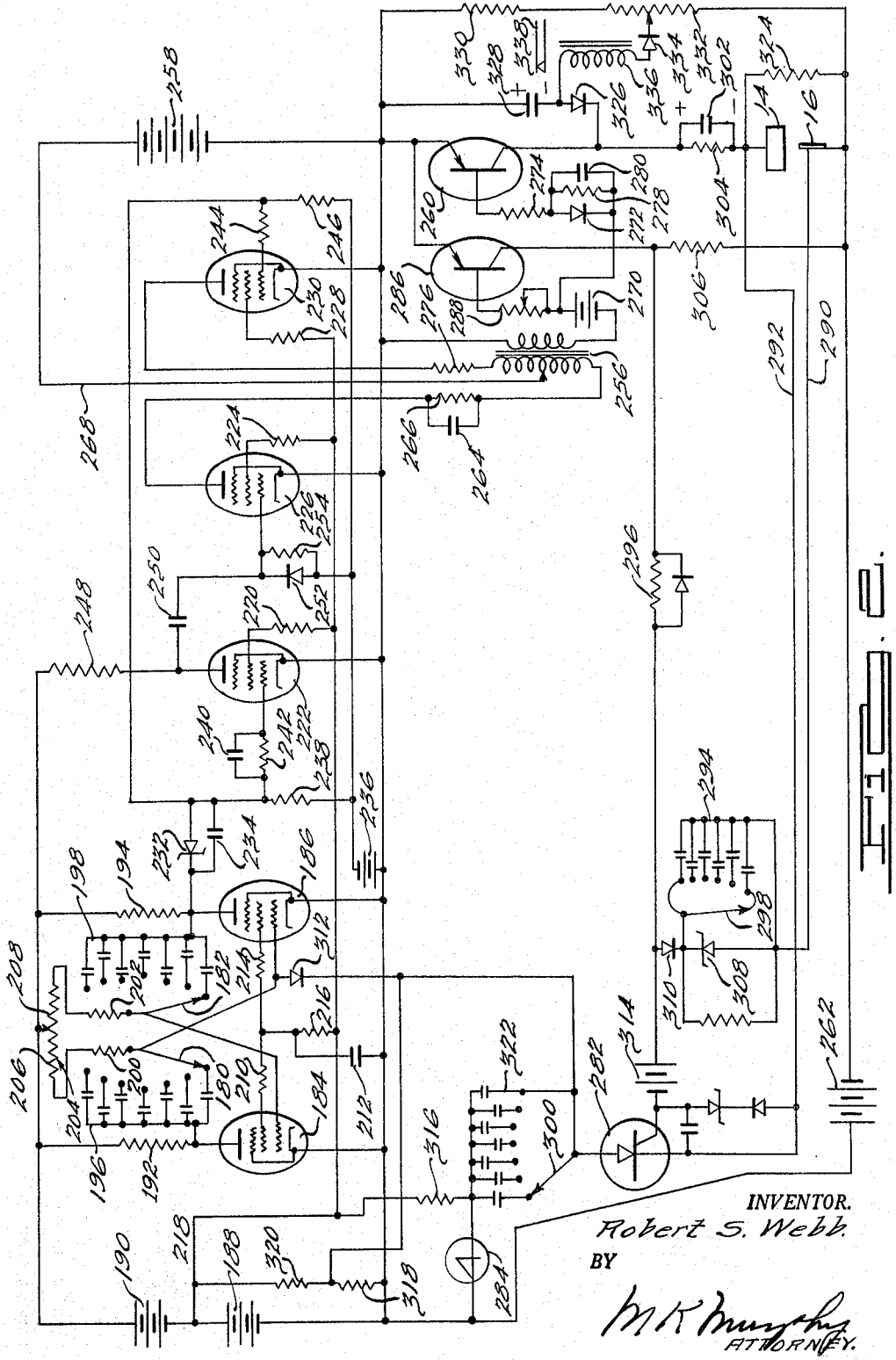
FIG. 2 shows a modified circuit having an improved form of vacuum tube amplifier employing a push-pull drive transformer for coupling drive to a transistor power switching bank and including a transistorized short circuit protection device.

FIG. 2 shows a somewhat different circuit in which a vacuum tube amplifier is coupled to the output transistor bank through a pulse transformer of special construction. A second keying transistor is driven in phase with the output bank but is isolated from the output bank for the reasons explained below.

The amplifier circuitry consisting of the multivibrator and first stage of vacuum tube amplification is quite similar to that shown in FIG. 1. The multivibrator circuitry is shown in more detail in FIG. 2 in which multiposition switches 180 and 182 show the actual connection of coupling capacitors in the grid circuit of the multivibrator tubes. Multivibrator pentodes 184 and 186 are similar in performance and characteristics to the corresponding tubes in FIG. 1. The amplifier plate supply voltage is derived from D.C. sources 188 and 190 as in the circuitry of FIG. 1. Plate load resistors 192 and 194 develop rectangular multivibrator signal resulting from the cross connection of typical coupling capacitors 196 and 198 and the corresponding grid resistance comprised of resistors 200, 202 and rheostat 204. Operation of this multivibrator circuit is identical in principle to that of FIG. 1 and is not repeated here. This circuit also maintains a substantially constant machining frequency with variations in ON-OFF time as portions 206 and 208 of rheostat 204 are changed in accordance with the above disclosure thereby resulting in a variable ON-OFF ratio at a relatively constant frequency. The screen grid of pentode 184 is returned through resistor 210 to common screen bypass capacitor 212 and the screen grid of pentode 186 is returned through resistor 214 to that bypass. Resistor 216 is selected to produce across capacitor 212 the desired screen voltage for the multivibrator deriving this voltage from common screen line 218 which connects to the center tap between plate supply 188 and 190.

Similarly resistor 220 returns the screen of amplifier 222 to line 218. Resistor 224 returns the screen grid of pentode 226 and resistor 228 returns the screen grid of pentode 230 to tap 218 on the plate supply. As described in the disclosure of FIG. 1 pentode 222, 226 and 230 generally are comprised of a bank of vacuum tubes in order to produce power of suitable magnitude. A similar reference supply is utilized in the output of multivibrator tube 186 by reference diode 232 and bypass capacitor 234. The negative end of this reference supply is connected respectively in the grid circuits of pentodes 222 and 230. The control grid of pentode 222 is returned to bias supply 236 through resistor 238 which in the absence of positive drive signal maintains pentode 222 nonconductive. Lead capacitor 240 and limiting resistor 242 are connected between bias resistor 238 and the grid of pentode 222 as similarly described in FIG. 1. Resistor 244 similarly connects to pentode 230 for limiting grid current of that pentode and resistor 246 returns the control grid of pentode 230 to bias supply 236 in the absence of positive drive signal.

Plate load resistor 248 is provided in the anode circuit of pentode 222 and coupling capacitor 250 is used in conjunction with clamping diode 252 and signal resistor 254 for driving the control grid of pentode 226.

From this analysis it can be seen that pentodes 226 and 230 operate out-of-phase or are connected push-pull for energizing drive transformer 256 under power in both positive and negative polarity. D.C. supply voltage 258 is generally much larger than the sum of drive supplies 188 and 190 thereby producing much higher output power levels in drive transformer 256.

This circuitry is phased such that multivibrator pentode 186, drive pentode 226 and power transistor bank 260 all conduct in phase to produce a machining power pulse between electrode 16 and workpiece 14. Machining power supply 262 operates in conjunction with power transistor bank 260 to deliver power to the machining circuit. Multivibrator pentode 184, buffer pentode 222 and amplifier pentode 230 all conduct out-of-phase with transistor 260 and are properly connected to render transistor 260 sharply nonconductive at the end of a machining power pulse.

Conduction of pentode 226 is from the negative terminal of drive supply 258 to the cathode-anode of pentode 226, through lead capacitor 264 and limiting resistor 266 to the lower portion of the primary of drive transformer 256 and returned through positive lead 268 to the positive terminal of supply 258. Conduction of pentode 226 energizes the secondary of transformer 256 such that the lower end of the secondary is rendered more negative in voltage than transistor bias 270. Power, in this instance, is forced from the secondary of the transformer through bias 270, rectifier 272, balancing resistor 274, base-emitter of transistor 260 to the upper end of the secondary of the transformer through bias 270, rectifier 272, balancing resistor 274, base-emitter of transistor 260 to the upper end of the secondary of the transformer which is at this instant positive.

Off drive is furnished similarly to transistor 260 as pentode 226 is rendered nonconductive and pentode 230 rendered conductive, furnishing power from supply 258, cathode-anode of pentode 230, limiting resistor 276 through the upper half of the primary of the transformer to lead 268 connected to the positive terminal of supply 258. Conduction in this direction renders the upper end of drive transformer secondary negative thereby boosting bias voltage 270 to render transistor 260 sharply nonconductive. Depending on the voltage characteristics of transistor 260, bias limiting resistor 278 and bias lead capacitor 280 are shown connected across rectifier 272 for limting voltage in the base-emitter circuit of transistor 260 during periods of nonconduction. Transistor 260 for best results has diffusion alloyed junctions thereby resulting in much faster switching times and much less storage time than a similar alloy junction device. Such a transistor has an emitter-collector voltage rating in excess of 100 volts but an emitter-base voltage rating in the vicinity of 1 to 5 volts since transistors of this type are nearly always operated in common emitter relationship. For such a transistor the network consisting of rectifier 272, resistor 278 and capacitor 280 is virtually mandatory in order to limit reverse curent in the base-emitter circuit during periods when the transistor is rendered nonconductive. For an alloy junction transistor having higher emitter-base ratings this network may be eliminated.

In any case, regardless of transistor type, this drive circuit, particularly drive transformer 256, is subject to particular consideration. As mentioned above, the ON-OFF ratio at a particular frequency can vary widely and in a typical advanced machining circuit will vary from a minimum ON time of approximately 1% of the total cycle at a particular frequency to approximately 80 or 90% conduction period of the total cycle. A transformer on the other hand, is an A.C. device in which the positive voltage area must exactly equal the negative voltage area. It is therefore virtually impossible, and certainly impractical, to operate transformer 256 without saturating its iron core during periods of narrow ON-time, or periods of wide ON-time when the transformer is used to drive a diffusion alloy transistor having extremely low emitter-base bias voltage breakdown.

During periods of narrow ON-time pentode 226 conducts for a very short portion of the entire cycle and pentode 230 conducts for the remainder of the cycle thereby saturating the core of the transformer in this direction. The effect of this saturation is to provide during turn-ON driven by pentode 226 a forward voltage spike of suitable magnitude and short duration and a reverse voltage spike of similar magnitude and short duration after which time the transformer saturates and transistor 260 is maintained nonconductive solely by bias 270 since no residual voltage exists across the secondary of transformer 256 during periods of saturation.

During the opposite ON-time condition in which pentode 226 is rendered conductive for a long portion of the total cycle, and pentode 230 conductive for the shorter portion of the cycle, resistor 278 must be properly selected to balance the voltage conditions at this time such that the long duration of forward drive voltage exists at a relatively low voltage just sufficient to overcome bias supply 270, rectifier 272, and balancing resistor 274 in the base-emitter circuit to render the transistor conductive, and during OFF period develop across resistor 278 the correspondingly higher voltage thereby minimizing saturation in this direction. It is essential that resistor 278 be properly chosen such that forward drive does not saturate under any conditions since this would result in loss of the proper magnitude of drive to transistor 260 during its conduction period. The presence of bias supply 270 always maintains the transistor nonconductive during the OFF portion of the cycle regardless of the presence or absence of drive voltage across the secondary of transformer 256.

The circuit must be designed in accordance with these principles in order to incorporate the advantage of a stepdown transformer for energizing the transistor bank from a vacuum tube amplifier having extremely wide variations in ON-OFF ratio at a particular frequency.

Capacitor 264 is provided in the turn-ON circuit for accelerating turn-ON of the transistor, and capacitor 280 is shunted across rectifier 272 for accelerating turn-OFF of the power transistor. Through use of these lead capacitors in the circuitry as shown, accelerated drive is provided whereby transistor 260 is rendered sharply conductive and nonconductive for the selected ON-OFF ratio and frequency.

The per pulse cut-off circuitry of FIG. 2 is similar in end result but quite different in operation from that of FIG. 1. In the circuitry of FIG. 2 controlled rectifier 282 is energized or triggered in a manner quite similar to rectifier 140 of FIG. 1. However the controlled period of OFF time is determined from an entirely different circuit actually comprising a one shot multivibrator circuit developed from four layer avalanche diode 284.

Another distinguishing characteristic of this cut-off circuit is that a separate keying transistor 286 is employed and operated in phase with power transistor 260 and is driven from the secondary of drive transformer 256 as is transistor 260 but having separate control in its drive circuit and an isolated collector circuit for the reasons described below.

By proper adjustment of rheostat 288 the correct amount of forward drive current is presented in the base-emitter circuit of keying transistor 286 to render it conductive but not saturated. Because of the high current and power requirements of transistor 260 it is saturated during periods of conduction to provide lowest power loss during this interval. Transistor 286 on the other hand is intentionally operated in a nonsaturated condition to overcome the limitation of storage time. As described in the circuitry of FIG. 1 and similarly presented here, it is undesirable to have the keying circuit turn-ON as sharply as the power circuit and for a similar reason it is desirable to have the keying circuit rendered nonconductive just prior to rendering the power circuit nonconductive. As described above, during periods of turn-ON the gap between the electrode and the workpiece will on occasion be bridged by high impedance stringer. This high impedance short circuit causes the voltage between the electrode and workpiece to be very low during initial period of turn-ON and would be interrupted as a short circuit if it were not for the fact the keying signal is appropriately delayed. For this reason sharp turn-ON of keying transistor 286 is actually undesirable whereas sharp turn-OFF is extremely important. As power transistor 260 is rendered sharply nonconductive the inductance in the power circuit tends to sustain conduction and will actually assume opposite polarity at the instant of turn-OFF. Thus at the instant of turn-OFF the voltage at the sensing lead ponts determined by sensing leads 290 and 292 may be actually negative or at least become zero much more rapidly than the corresponding voltage at the collector of transistor 260. By providing a separate keying transistor as shown in this circuit proper operation of the short circuit controlled rectifier 282 is assured since the keying circuit is rendered nonconductive just shortly before transistor 260 is rendered nonconductive by the elimination of storage time in transistor 286.

As described in the disclosure of FIG. 1, a delay capacitor 294 is provided in conjunction with resistor 296 for delaying keying signal in the base circuit of the controlled rectifier. In this circuit seven tap settings are shown for seven different frequency combinations. It is obvious that more or fewer tap settings may be provided in accordance with the design requirements of a particular machine. In this example tap switches 180, 182, 298, and 300 are ganged together and operated simultaneously thereby providing at any particular frequency setting the desired delay period and the desired period between pulses during conditions of short circuit as determined with the cut-off control circuitry operated in conjunction with controlled rectifier 282.

To accelerate gap conduction during the initial period of turn ON of power transistor 260, lead capacitor 302 is provided across dropping resistor 304. This lead capacitor accelerates current switching through the gap tending to more rapidly break down high impedance stringers during this initial period of each power pulse. This accelerates proper gap conduction and improves stability particularly during the initial portions of each machining pulse.

While capacitor 302 provides a lead or acceleration in turn-ON, the voltage is similarly stored across it during conduction period negative to positive in the polarity shown. During turn-OFF of the transistor this voltage subtracts from the total voltage effective across the collector of the transistor thereby canceling the effect of inductance and minimizing the tendency of inductive currents breaking down transistor 260. This same voltage stored across capacitor 302 would result in the circuitry of FIG. 1 in a delayed turn-OFF of keying signal. In either circuit a delayed turn-OFF of keying signal would render the keying circuit operative at the end of each pulse thereby eliminating each successive pulse simply because of malfunction of the keying circuit itself.

In this example keying transistor 286 is isolated from the power circuitry and the inductive effects are completely eliminated as is the stored voltage of capacitor 302. Keying signal is developed across resistor 306 by switching of transistors 286 in phase with transistor 260 properly energizing the delay circuit 294, 296.

At the initial portion of each cycle as determined by the delay of capacitor 294 in conjunction with resistor 296, a positive keying voltage is provided in the base circuitry of controlled rectifier 282. This voltage is controlled in magnitude by reference diode 308 and series blocking diode 310. As in the circuitry of FIG. 1, if the voltage across the gap is of sufficient magnitude, the cathode of controlled rectifier 282 is rendered sufficiently positive to maintain rectifier 282 nonconductive. If after the delayed interval of the keying pulse the cathode has not been rendered sufficiently positive, controlled rectifier 282 is triggered instantaneously into conduction.

Conduction of controlled rectifier 282 interrupts operation of the multivibrator thereby instantaneously shutting off drive to power transistor 260. In a manner exactly like the circuitry of FIG. 1 the anode of controlled rectifier 282 is connected to the control grid of multivibrator pentode 186 through diode 312.

During normal operation bias 314 maintains controlled rectifier 282 nonconductive during the absence of keying signal or a corresponding voltage across the gap. At this time avalanche diode 284 is conductive through resistor 316 connected to the screen grid tap 218 or to the positive terminal of supply 190. Diode 312 is similarly blocked by connection of its cathode and the anode of controlled rectifier 282 to the positive voltage tap provided between resistors 318 and 320 connected across supply 188.

At the instant of conduction of controlled rectifier 282, corresponding to a faulty pulse, the anode of avalanche diode 284 is connected to the negative terminal of supply 262 through rectifier 282 and typical storage capacitor 322. This blocks conduction through avalanche diode 284 and controlled rectifier 282 is maintained conductive thereby maintaining the grid of multivibrator tube 186 connected essentially to the negative terminal of supply 262 through the shorted electrode workpiece, sensing lead 292, cathode-anode of controlled rectifier 282, diode 312 to the grid multivibrator pentode 186, thereby maintaining this tube nonconductive. A charging current also occurs from the anode of rectifier 282 through switch 300, typical capacitor 322, resistor 316, to positive terminal 218. As the voltage across capacitor 322 becomes sufficiently positive to overcome the voltage 262 and to equal in addition to this voltage the breakdown voltage of avalanche diode 284, avalanche diode 284 again becomes conductive. The voltage across capacitor 322 is at that instant more positive than voltage 262 by the amount of the breakdown voltage of avalanche diode 284. As diode 284 breaks down it instantaneously connects this voltage directly to the anode of controlled rectifier 282 rendering it sharply negative by this excess amount thereby rendering it nonconductive. This negative voltage is also presented through diode 312 to the grid of multivibrator tube 186 and corresponding coupling capacitor 196. After recovery of the multivibrator grid from this increased negative voltage, tube 186 again becomes conductive signaling a power pulse from transistor 260 and the circuit has been restored to its normal or steady state condition.

Each of these circuits operates during each pulse to electronically inspect machining conditions, and interrupts only faulty pulses or portions of a faulty pulse, and further immediately after a faulty pulse provides an OFF-time or recovery time somewhat longer than that normally provided between pulses of suitable machining characteristics. In the circuitry of FIG. 2 a one shot or monostable multivibrator is formed of controlled rectifier 282 and avalanche diode 284 to achieve the same end result as the inductance-capacitance circuit shown in FIG. 1.

An additional circuit is shown in FIG. 2 for protecting the power circuit from malfunction of transistor 260 and for protecting electrode 16 and workpiece 14 from a failure of an individual transistor within this bank or of the entire bank itself. The input of this circuit is comprised of resistor 324 shunted between electrode 16 and workpiece 14, diode 326 and storage capacitor 328. During proper conditions of switching of power transistor 260, it is rendered essentially nonconductive during its normal OFF time and, of course, rendered sharply conductive during periods of ON time. During a period of OFF time the collector of transistor 260 blocks and the voltage at collector 260 is essentially that of supply 262. During this blocked condition of transistor 260 a charging electron flow occurs from the negative terminal of supply 262 through resistor 324, diode 326, charging capacitor 328 and resistor 329. A voltage divider network is provided by resistor 330 and potentiometer 332 having blocking diode 334 connected to its control arm. If the voltage across capacitor 328 is equal to or slightly below the voltage at the control arm of potentiometer 332, relay 336 is de-energized permitting contacts 338 to be closed. If the voltage stored across capacitor 328 is sufficiently below this reference, electron flow occurs from the control arm of potentiometer 332 through diode 334, relay coil 336, capacitor 328, resistor 330 and the upper portion of potentiometer 332 thereby energizing relay 336. Contacts 338 interrupt the machining power portion of this circuit effectively shutting off the machine and disconnecting the machining power voltage 262 from power transistor 260 and the machining gap.

All transistors fail, at least initially, in a shorted or partially conducting condition. Experience has indicated that immediately prior to a full short circuit of such a transistor it is rendered partially conductive during periods when it is normally totally nonconductive. By proper selection of resistor 324 even slight leakage through power transistor bank 260 during the period of OFF time is sufficient to decrease the voltage stored across capacitor 328 thereby energizing relay coil 336. Frequently the interruption of power at this time is sufficient to permit full recovery of the power transistor bank and permit satisfactory operation upon restart of the machine. If a faulty transistor does exist at this time, energization of relay coil 336 will prevent turn-ON of the machining power thereby protecting the electrode and workpiece from a faulty transistor. This protection circuit is particularly important where large numbers of transistors are employed in parallel in bank 260 and during finishing operations requiring extremely close tolerance and fine surface finish on the workpiece. While transistor failure is infrequent, it is nevertheless possible and through use of this circuit additional damage is prevented and in many instances recovery of the faulty transistor permitted.

Figure 3:
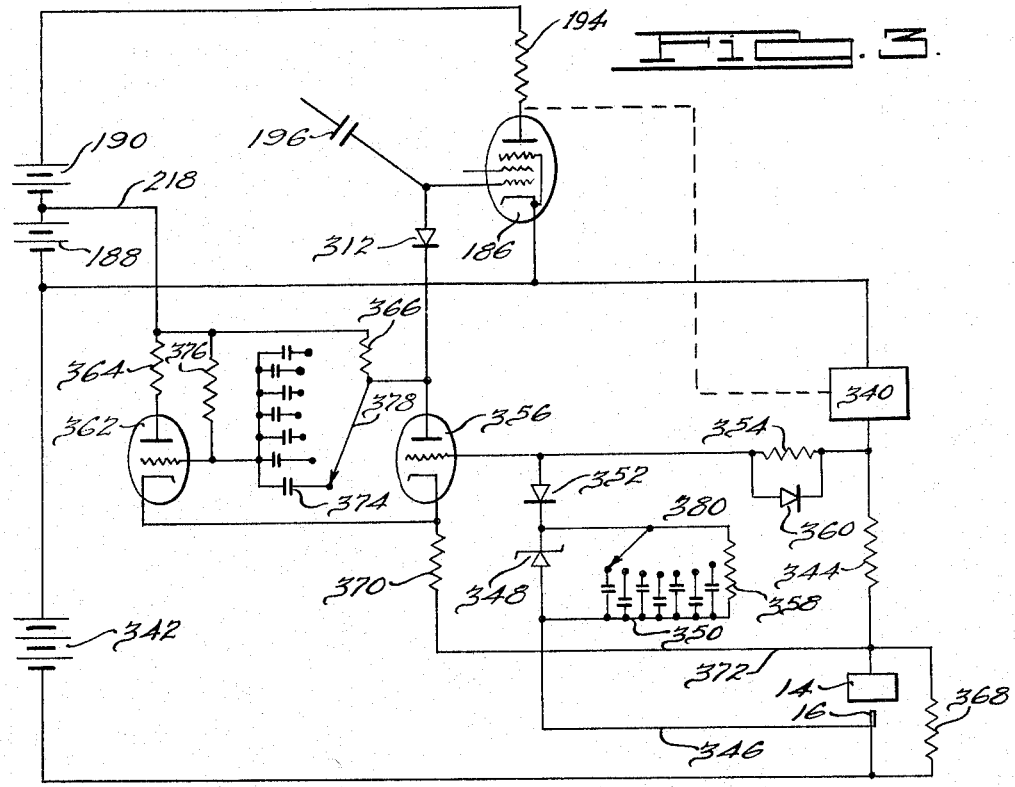
FIG. 3 is a further modification and includes a vacuum tube one-shot multivibrator circuit for high frequency controlled delay interval short circuit protection having leading edge delay.

FIG. 3 shows still another circuit employing a one-shot multivibrator comprised in this example of a vacuum tube short circuit protection device. A multi-electrode electronic switch such as a transistor, vacuum tube, or other switching device is incorporated and shown as electronic switch 340 which is pulse driven as in the previous circuits and during periods of conduction permits power to flow between electrode 16 and workpiece 14 from machining power source 342. Electron flow in the power loop is from the negative terminal of source 342, electrode 16, workpiece 14, limiting resistor 344, electronic switch 340 to the positive terminal of supply 342.

As in the previous circuits the cathodes of the short circuit protection device are connected to the positive side of the gap. A keying circuit identical to that of FIG. 2 is connected to the negative electrode and consists of sensing lead 346, reference diode 348, typical delay capacitor 350, series blocking diode 352, and keying resistor 354. This portion of the keying circuit operates identical to that of FIG. 2 in which conduction of electronic switch 340 draws electron flow through sensing lead 346, reference diode 348, diode 352, resistor 354, presenting at the grid of vacuum tube 356 a positive signal of controlled magnitude with respect to electrode 16 occuring in phase and only at the time of closure of switch 340. A resistor 358 is provided in shunt with typical capacitor 350 to provide a discharge path therefore and diode 360 is connected in parallel with resistor 354 to carry the grid of tube 356 rapidly negative upon disappearance of keying signal.

The cut-off device bias supply is replaced in this circuit by reset vacuum tube 362 conducting in a steady state condition through resistor 364. In the absence of error signal, vacuum tube 362 is maintained conductive since resistor 376 connects the control grid of tube 362 to the positive voltage tap 218 between drive plate voltage supply 188 and 190. Steady state conduction of this reset tube is from the negative terminal of supply 342, resistor 368, resistor 370, cathode to anode of tube 362, plate load resistor 364 to the positive tap 218 and returned to the positive terminal of supply 342. The voltage drop developed across resistor 370 is sufficient in the absence of gap signal to maintain tube 356 nonconductive.

As in the circuitry of FIG. 2, the keying signal developed across reference diode 348 and diode 352 must be sufficient to overcome the bias developed across resistor 370. At the threshold voltage or voltage just above that causing operation of the cut-off circuitry the voltage at the positive electrode sensed by lead 372 is a definite and predetermined magnitude resulting in a definite voltage drop across resistor 370, tube 362 and resistor 364. As the gap voltage falls just below this threshold level, or upon initiation of a pulse should it fail to rise to this level, cut-off tube 356 is rendered conductive just as controlled rectifier 282 in the circuitry of FIG. 2. Partial conduction of tube 356 instantaneously interrupts operation of multivibrator tube 186 through diode 312 in a manner identical to that of the circuitry of FIG. 2 by charging a negative voltage on coupling capacitor 196 through the opposing plate load resistor not shown in FIG. 3. It is understood that the multivibrator circuitry and amplifier may be identical to that of FIGS. 1 or 2.

Instantly upon conduction of tube 356 an additional voltage drop is developed across resistor 366 carrying the grid of tube 362 negative through typical coupling capacitor 374. Interconnection of tubes 356 and 362 in this manner produces a one-shot or monostable multivibrator and signal at this instant becomes regenerative, sharply cutting off tube 362. In the absence of conduction through resistor 370 by tube 362, tube 356 becomes even more conductive and remains in conduction through resistor 370 and plate load resistor 366 until the cycle is reset by operation of tube 362. Resistor 366 has relatively larger resistance value than resistor 364 producing less voltage drop across resistor 370 during conduction of tube 356 permitting it to operate in a Class A condition.

As coupling capacitor 374 discharges through resistor 376, tube 362 is again rendered conductive. As tube 362 becomes conductive, completing the cycle, it draws electron flow through resistor 370 which tends to decrease current flow through tube 356 again in a regenerative condition. Conduction of tube 362 completes reset of the per pulse cut-off circuit restoring it to steady state condition.

After the normal delay time determined by coupling capacitor 196, and multivibrator tube 186, an additional pulse is permitted to pass to the gap thus completing one full cycle of operation. Each subsequent cycle is similarly inspected and after the delay interval determined by capacitor 350 operates to interrupt pulses having a gap voltage below the preset minimum. Tap switches 378 and 380 are operated simultaneously and in conjunction with the corresponding frequency tap switch of the master multivibrator not shown. In the example of FIG. 3 seven different frequency taps are shown containing seven different delay capacitors 350 for seven different delay intervals and seven reset time constant capacitors 374. Capacitor 374 operates in conjunction with resistor 376 to have an operating time constant approximately three times longer than that of the master multivibrator circuit, their operation being identical to that described in FIGS. 1 and 2. This circuit, employing vacuum tubes rather than controlled rectifiers, is required in relatively high frequency circuits operating above the frequency ratings of controlled rectifiers. Present controlled rectifiers are unusual at frequencies above 200 kc. and require vacuum tube circuitry of this type shown or a transistor circuit constructed in a similar manner.

Figure 4:
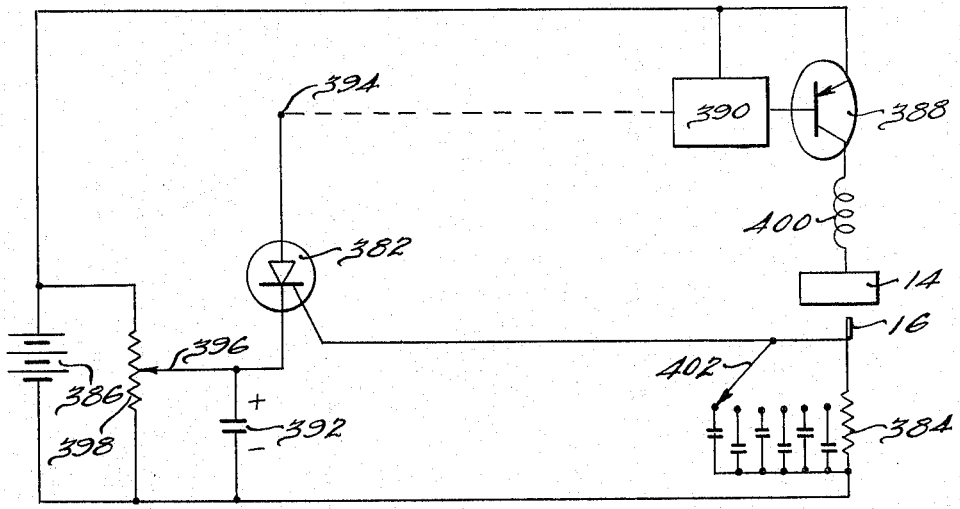
FIG. 4 is a still further modification and shows a circuit not requiring a keying pulse network yet having the essential operating characteristics of the other circuits.

FIG. 4 shows a somewhat different circuit eliminating the need for a keying pulse and yet having the essential characteristics of per pulse short circuit control similar in operation to the above three circuits.

In the circuit of FIG. 4 controlled rectifier 382 has its gate connected to electrode 16. Current sensing resistor 384 connects the electrode to the negative terminal of machining power supply 386. As transistor bank 388 is rendered conductive by pulser 390 in a manner identical to that in the circuit of FIG. 2, a pulse of machining power is permitted providing that the gap spacing is proper. A voltage is developed across resistor 384 in direct proportion to the machining current. As the voltage between electrode 16 and workpiece 14 falls below the desired level, the machining current as indicated by the drop across resistor 384 correspondingly increases above the desired level. If the voltage developed across resistor 384 is sufficient to overcome the bias stored across capacitor 392, controlled rectifier 382 is rendered instantly conductive. The anode of controlled rectifier 382 is connected at terminal 394 to either of the anode circuits of FIGS. 1 or 2 or a similar circuit operating as described above.

The principal advantage of this circuit is the elimination of the need for a keying pulse and for sensing gap voltage. Any pulse having a machining current above the level determined by the setting of potentiometer arm 396 on potentiometer 398 instantly triggers controlled rectifier 382, interrupting that pulse and producing a delay interval as determined by the appropriate recovery time capacitor as shown in FIGS. 1 or 2. An additional simplification in this circuit may lie in the fact that some amount of circuit inductance, shown lumped in this instance as inductance 400, is unavoidable. This inductance retards the increase of current flow and therefore retards the voltage across resistor 384. In some instances delay capacitor 401 and switch 402 are unnecessary since inductance 400 establishes the initial current flow in the circuit. Thus an extremely simple sensing circuit may replace the more complicated keyed circuits shown in FIGS. 1 through 3 with identical performance on a per pulse basis.

It is obvious from the circuitry of FIG. 4 that other circuits may be developed in accordance with these principles responsive to machining current or machining voltage or both, it being simply a matter of choice determined by the principles disclosed above.

In the above drawings, the D.C. supplies are shown as batteries in the interest of simplifying the disclosure. In actual practice, these sources of D.C. are derived from the secondary of a transformer having its primary connected to the power source for the machine which may be single phase or polyphase A.C. The secondary voltage is rectified and stored, usually in an electrolytic storage capacitor bank to form a nearly ideal D.C. source having very low internal impedance.

In the above examples, the electrode is shown as connected to the negative output of the machining power supply and the workpiece to the positive output. Present day knowledge indicates that in certain specialized and improved forms of machining that polarity may be reversed. It is essential in each case that discrete pulses of the same polarity be applied in each case and that polarity be selected in accordance with known principles. The above examples apply equally well to either polarity of machining Thus it will be seen that I have shown and described a new and improved per pulse cut-off and succeeding pulse delay circuit for electrical discharge machining, and preferred examples of apparatus constructed in accordance with the teachings of this invention. By so doing it is not intended to limit the invention to the above disclosure but only as set forth in the following claims.

I claim:
1. Apparatus for machining a conductive workpiece by means of intermittent electrical discharge across a gap between an electrode tool and the workpiece comprising, a source of machining power, an electronic switch connected between said source and said gap, a pulser operatively associated with said switch for rendering said switch alternately conductive and nonconductive at selected frequency, a cut-off device operatively connected with said pulser operable to trigger said pulser to render said switch instantly nonconductive in response to a discharge of abnormal characteristic after initiation of but prior to the end of, normal duration of said discharge, including means connected with said device and pulser for delaying initiation of the following discharge for a time interval longer than the normal interval between discharges.

2. Apparatus for machining a conductive workpiece by means of intermittent electrical discharge across a gap between an electrode tool and the workpiece comprising, a source of machining power, an electronic switch connected between said source and said gap, a pulser operatively associated with said switch for rendering said switch alternately conductive and nonconductive at selected frequency, a cut-off device operable for rendering said switch instantly nonconductive in response to a discharge having a voltage less than a predetermined minimum including keying means tending to render said cut-off device operative in phase with said pulser, means responsive to gap voltage above said minimum for maintaining said cut-off device inoperative, and means responsive to operation of said cut-off device for delaying the succeeding discharge following operation of said cut-off device.

3. The combination set forth in claim 2 in which said last named responsive means includes a resistance-capacitance network for storing an off bias for said pulser for a duration determined by said network.

4. Apparatus for machining a conductive workpiece by means of intermittent electrical discharge across a gap between an electrode tool and the workpiece comprising, a source of machining power, an electronic switch connected between said source and said gap, a pulser operatively associated with said switch for rendering said switch alternately conductive and nonconductive, a cut-off device operable in response to discharge current magnitude in excess of predetermined maximum for rendering said switch instantly nonconductive including means responsive to operation of said cut-off device for delaying initiation of the next following discharge.

5. Apparatus for machining a conductive workpiece by means of intermittent electrical discharges across a gap between an electrode tool and the workpiece comprising, a source of machining power, periodically operable switching means connected between said source and the gap, cut-off means operatively connected to the gap and operable to instantly render said switch nonconductive in response to an electrical discharge across the gap having an abnormal electrical characteristic after initiation of but prior to the end of normal discharge duration, and delay means operable responsive to operation of said cut-off means for delaying conduction of said switching means for a predetermined period longer than the normal period between discharges.

6. Apparatus for machining a conductive workpiece by means of intermittent electrical discharge across a gap between an electrode tool and the workpiece comprising, a source of machining power, periodically operable switching means connected between said source and the gap, cut-off means operatively connected to the gap and operable to render said switch nonconductive in response to an electrical discharge across the gap of abnormal electrical characteristic after initiation of but prior to the end of normal discharge duration, delay means operable responsive to operation of said cut-off means for delaying conduction of said switching means and the formation of the next following discharge for a predetermined time interval longer than the normal interval between discharges, and keying means operatively connected to said cut-off means for conditioning it for operation in phase with said switching means.

7. In an apparatus for machining a conductive workpiece by intermittent electrical discharge across a gap between an electrode tool and the workpiece, a power source, a periodically operable electronic switch connected to said power source to deliver to the gap power pulses having a normal on-time substantially longer than their normal off-time, a cut-off device operatively connected to said switch and operable in response to a gap discharge of abnormal characteristic to render said switch instantly nonconductive after initiation of but prior to the end of normal duration of said discharge, and delay means operatively connected to said device for providing a longer than normal off-time prior to initiation of the next following pulse.

8. Apparatus for machining a conductive workpiece by means of intermittent electrical discharge across a dielectric coolant filled gap between an electrode tool and the workpiece comprising, a source of machining power, a periodically operated electronic switching means operatively connected to said source and said gap for providing said discharges thereacross, a cut-off means operatively connected to said gap and operable to interrupt the operation of said switching means responsive to an electrical discharge across said gap having an abnormal electrical characteristic, and a delay means operatively connected to said cut-off means for delaying its operation for a predetermined time interval after initiation of each of said discharges.

9. The combination as set forth in claim 8 in which said cut-off means is operable responsive to a gap voltage below a predetermined minimum magnitude.

10. The combination as set forth in claim 8 in which said cut-off means is operable responsive to gap current above a predetermined maximum magnitude.

11. The combination as set forth in claim 8 in which said delay means comprises a resistance-capacitance network operatively connected between said cut-off means and said gap.

12. Apparatus for machining a conductive workpiece by means of intermittent electrical discharge across a dielectric coolant filled gap between an electrode tool and the workpiece comprising a source of machining power, a periodically operated electronic switching means connected to said source and said gap to provide discharges thereacross, a cut-off means operatively connected to said gap and operable to interrupt operation of said switching means in response to an electrical discharge across said gap of an abnormal electrical characteristic after initiation of but prior to normal discharge completion, and a delay means operatively connected between said cut-off means and said gap for delaying initiation of the following discharge for a time interval longer than the normal interval between said discharges.

13. A pulse generator for a load device to provide electrical pulses thereacross comprising a source of power, a periodically operated electronic switch operatively connected to said source and to said device for providing electrical pulses thereacross, a cut-off means operatively connected to said device and operable to interrupt the operation of said switching means in response to a pulse of abnormal electrical characteristic after initiation of but prior to normal completion of said pulse, and means operatively connected to said switching means and said cut-off means for delaying initiation of the following pulse for a time interval longer than the normal interval between said pulses.

14. Apparatus for machining a conductive workpiece by means of intermittent electrical discharge across a dielectric coolant filled gap between an electrode tool and the workpiece comprising, a source of machining power, a periodically operated electronic switching means operatively connected to said source and said gap for providing said discharges thereacross, a cut-off means operatively connected to said gap and operable to interrupt the operation of said switching means responsive to an electrical discharge across said gap of an abnormal electrical characteristic, a first delay means operatively connected to said cut-off means for delaying its operation for a predetermined time interval after initiation of each of said discharges and a second delay means operatively connected between said cut-off means and said gap for delaying initiation of the following discharge for a time interval longer than the normal interval between said discharges.

References Cited by the Examiner

UNITED STATES PATENTS

| | | | |
|---|---|---|---|
| 2,951,969 | 9/1960 | Matulaitis et al. | 315—227 |
| 3,018,411 | 1/1962 | Webb | 315—227 |

JOHN W. HUCKERT, *Primary Examiner.*

RALPH G. NILSON, *Examiner.*

C. R. CAMPBELL, R. SANDLER, *Assistant Examiners.*